United States Patent
Jang

(10) Patent No.: US 11,039,679 B2
(45) Date of Patent: Jun. 22, 2021

(54) ACCESSORY FOR PORTABLE DEVICE

(71) Applicant: AAUXX KOREA CO., LTD, Gyeonggi-do (KR)

(72) Inventor: Jin Tae Jang, Seoul (KR)

(73) Assignee: AAUXX KOREA CO., LTD, Paju-si (KR)

( * ) Notice: Subject to any disclaimer, the term of this patent is extended or adjusted under 35 U.S.C. 154(b) by 0 days.

(21) Appl. No.: 16/767,051

(22) PCT Filed: Oct. 22, 2018

(86) PCT No.: PCT/KR2018/012512
§ 371 (c)(1),
(2) Date: May 26, 2020

(87) PCT Pub. No.: WO2019/103321
PCT Pub. Date: May 31, 2019

(65) Prior Publication Data
US 2020/0297103 A1   Sep. 24, 2020

(30) Foreign Application Priority Data
Nov. 27, 2017 (KR) .......................... 10-2017-0159386

(51) Int. Cl.
*A45F 5/10* (2006.01)
*A45C 11/00* (2006.01)
*H04M 1/04* (2006.01)

(52) U.S. Cl.
CPC ............... *A45F 5/10* (2013.01); *A45C 11/00* (2013.01); *A45C 2011/002* (2013.01);
(Continued)

(58) Field of Classification Search
CPC ............... A45F 2200/0516; A45F 5/10; A45F 2005/1006; A45C 2011/002;
(Continued)

(56) References Cited

U.S. PATENT DOCUMENTS 6,352,186 B1 * 3/2002 Endo ...................... H04B 1/385
224/254
7,926,429 B2 * 4/2011 Wu ........................ G06F 1/1632
108/43
(Continued)

FOREIGN PATENT DOCUMENTS

KR   20-0274631   5/2002
KR   10-1267636   5/2013
(Continued)

OTHER PUBLICATIONS

International Search Report from PCT Application PCTXR2018/012512, dated Mar. 27, 2019, 2 pgs.
(Continued)

*Primary Examiner* — Justin M Larson
(74) *Attorney, Agent, or Firm* — Patterson Thuente Pedersen, P.A.

(57) ABSTRACT

An accessory for portable device includes a case which is to be mounted on the portable device, the case including a through hole extending in one direction, and a guide rail provided along both sides of the through hole, a plate including guide grooves being configured to receive the guide rail on both sides thereof, the plate being guided by the guide rail so as to be movable along an extending direction of the through hole, a connecting part rotatably fixed to the plate, a ring part pivotably fixed to the connecting portion so as to have various angles with respect to the connecting part, and at least one uneven portion including concave-convex portions which are arranged along the guide rail for receiving protrusions of the plate to fix the plate to a plurality of positions.

9 Claims, 9 Drawing Sheets

(52) U.S. Cl.
CPC ... *A45C 2200/15* (2013.01); *A45F 2200/0516* (2013.01); *H04M 1/04* (2013.01)

(58) Field of Classification Search
CPC ....... A45C 2200/15; H04B 2001/3861; H04M 1/04; H04M 1/0281; F16M 11/10
See application file for complete search history.

(56) References Cited

U.S. PATENT DOCUMENTS

| | | | | |
|---|---|---|---|---|
| 8,833,620 | B2 * | 9/2014 | Interdonato | A45F 5/00 224/217 |
| 9,179,565 | B2 * | 11/2015 | Cho | F16M 13/04 |
| 9,185,954 | B2 * | 11/2015 | Cheung | F16M 11/10 |
| 9,377,154 | B2 * | 6/2016 | Hung | F16M 11/105 |
| 9,397,717 | B2 * | 7/2016 | Curran | H04M 1/0281 |
| 9,421,920 | B2 * | 8/2016 | Jang | H04M 1/04 |
| D811,412 | S * | 2/2018 | McCurdy | D14/440 |
| D844,598 | S * | 4/2019 | Jang | D14/251 |
| 10,274,814 | B2 * | 4/2019 | Jeon | F16M 11/041 |
| 10,278,299 | B2 * | 4/2019 | Kim | E05D 3/022 |
| 10,349,728 | B2 * | 7/2019 | Yoo | H04M 1/04 |
| D858,507 | S * | 9/2019 | Jang | D14/251 |
| 10,428,997 | B2 * | 10/2019 | Jang | F16M 13/00 |
| 10,530,411 | B2 * | 1/2020 | Gehlhausen | F16M 11/38 |
| 10,533,700 | B1 * | 1/2020 | Mulhall | F16M 11/12 |
| 10,610,004 | B1 * | 4/2020 | Yeo | A45F 5/10 |
| 10,627,046 | B1 * | 4/2020 | Jang | G06F 1/1635 |
| 2013/0146625 | A1 * | 6/2013 | Karie | A45F 5/00 224/217 |
| 2014/0166707 | A1 * | 6/2014 | Leisey-Bartsch | H04B 1/3888 224/197 |
| 2016/0230925 | A1 * | 8/2016 | Le Gette | F16M 11/041 |
| 2019/0055062 | A1 * | 2/2019 | Winn | H04B 1/3888 |
| 2020/0297103 | A1 * | 9/2020 | Jang | A45C 11/00 |

FOREIGN PATENT DOCUMENTS

| | | | | |
|---|---|---|---|---|
| KR | 10-2017-0101066 | | 12/2017 | |
| KR | 10-2017-0083333 | | 2/2018 | |
| KR | 10-2017-0060805 | | 6/2018 | |
| WO | WO-2019066243 A1 * | 4/2019 | | A45F 5/00 |
| WO | WO-2019103321 A1 * | 5/2019 | | A45C 11/00 |
| WO | WO-2019112267 A1 * | 6/2019 | | H04M 1/04 |
| WO | WO-2020009808 A1 * | 1/2020 | | A45F 5/00 |
| WO | WO-2020067604 A1 * | 4/2020 | | G06F 1/1626 |

OTHER PUBLICATIONS

Office Action from related Korean Application KR10-2017-0159358, dated Nov. 27, 2017, 6 pgs. No English translation available.

* cited by examiner

[FIG. 1]
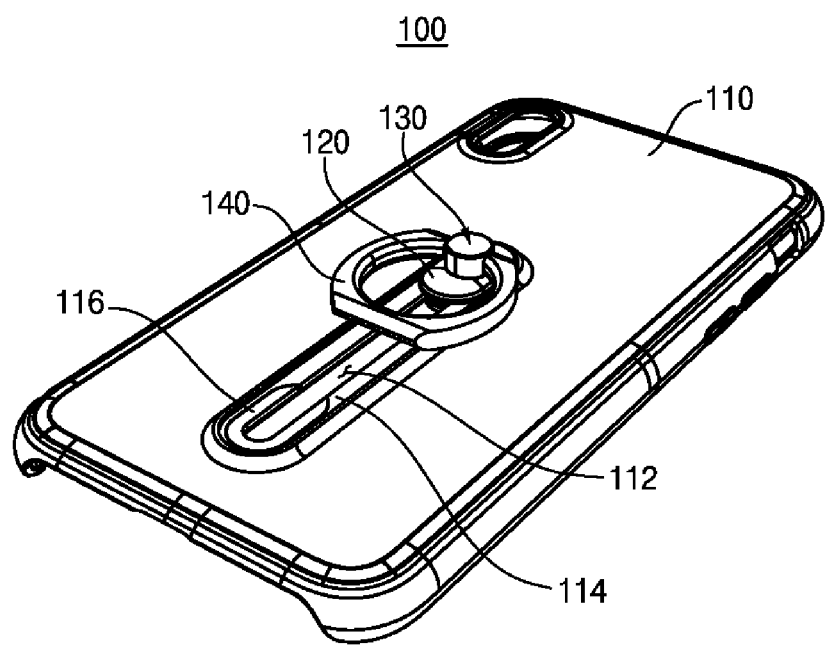

[FIG. 2]
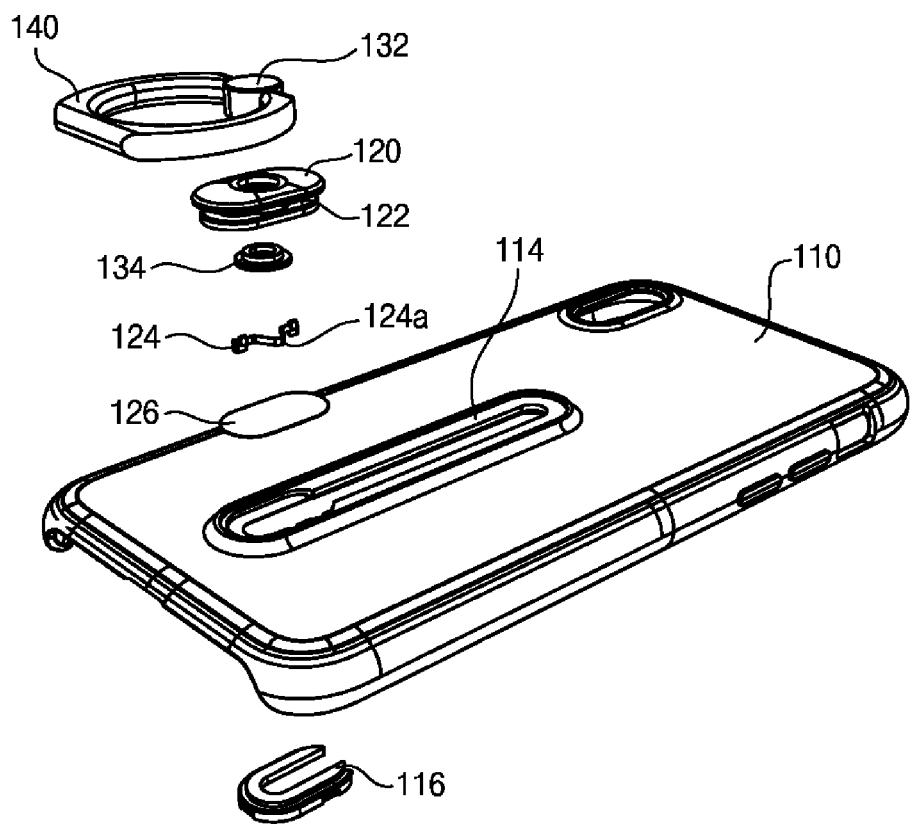

[FIG. 3]
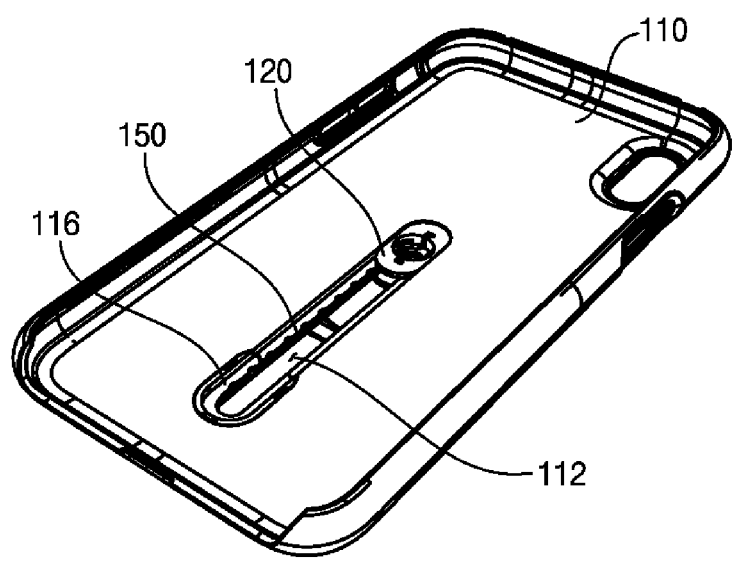

[FIG. 4]
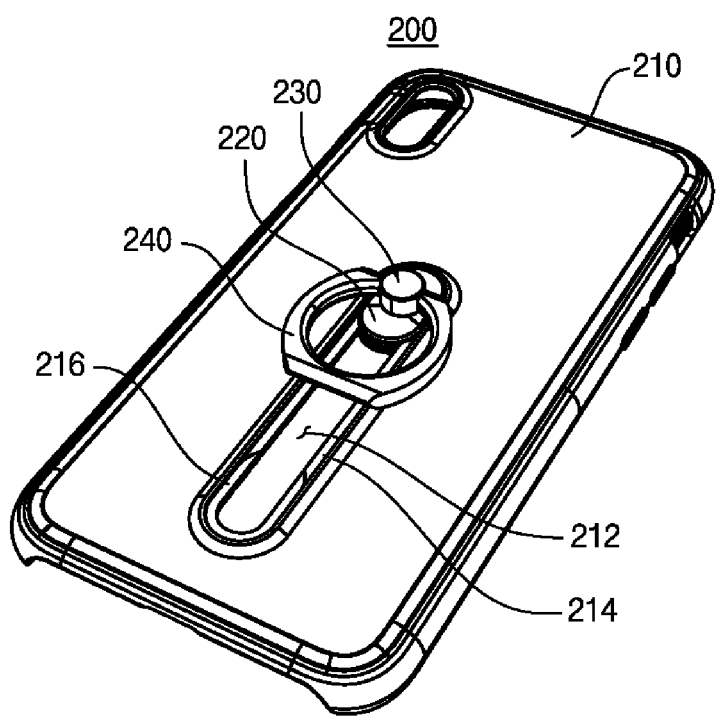

[FIG. 5]
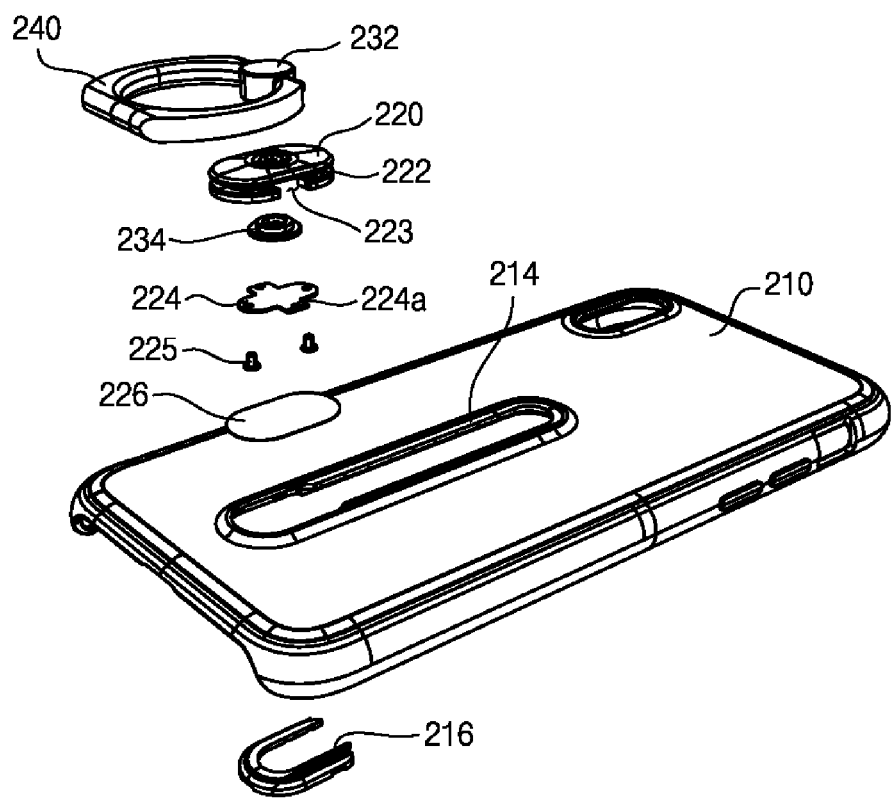

[FIG. 6]
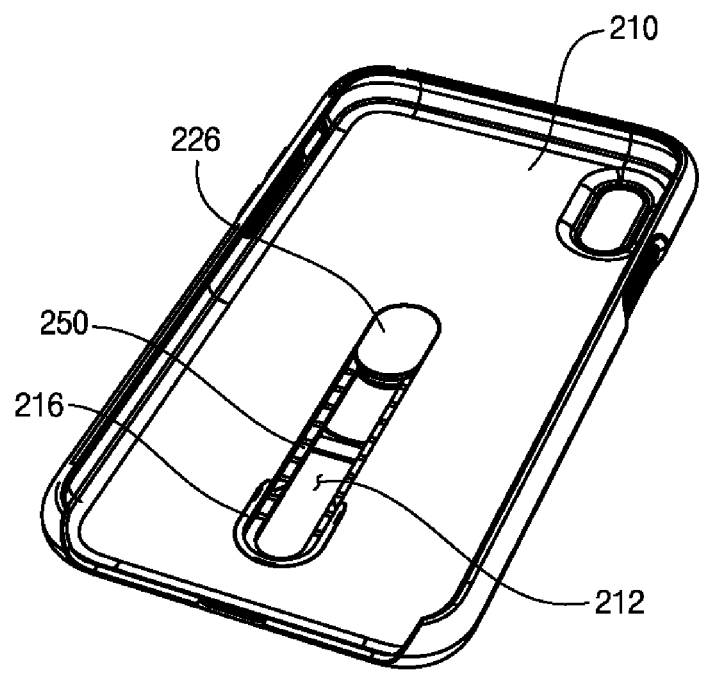

[FIG. 7]
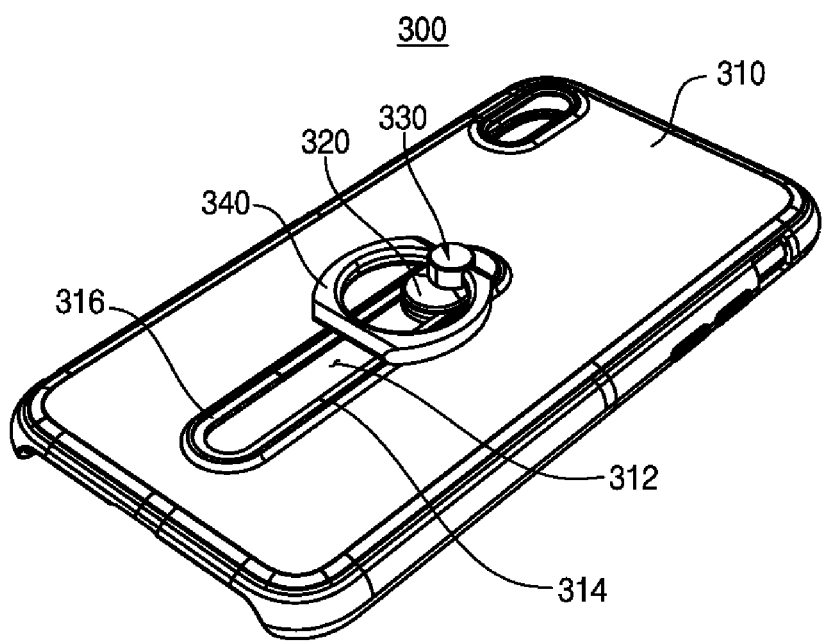

【FIG. 8】
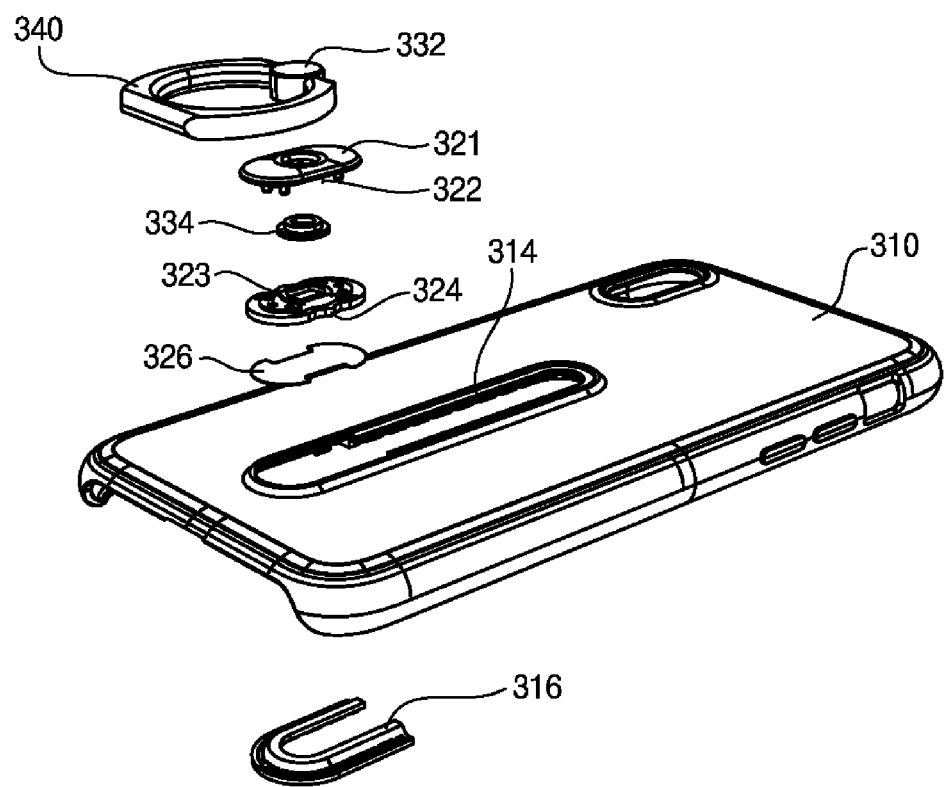

[FIG. 9]
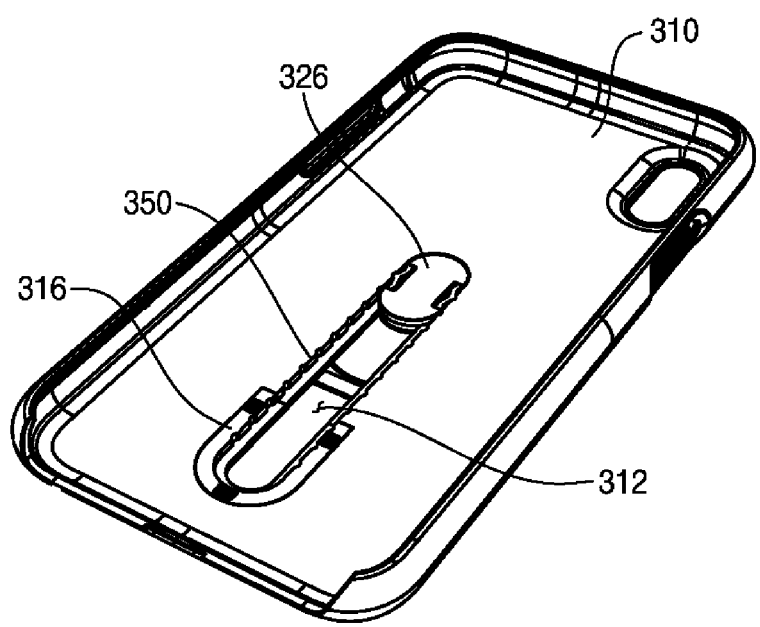

ACCESSORY FOR PORTABLE DEVICE

TECHNICAL FIELD

Example embodiments of the present invention relate to an accessory for portable device. More particularly, example embodiments of the present invention relate to an accessory for portable device which a user may easily carry.

BACKGROUND ART

Recently, a portable device such as a portable media player (PMP) has come into wide use. A user has utilized various accessories in order to carry the portable device easily. For example, an annular accessory having a ring part into which the user may insert one of his fingers, may be mounted on the portable device such that the user may carry the portable device conveniently.

In general, the annular accessory can be fixed to a center portion of the rear of the portable device. It may be difficult to separate the annular accessory from the portable device or to change a fixed position of the annular accessory on the portable device. Since either a size of the portable device or a size of the user's hand is various. the fixed position of the annular accessory which the user prefers to fix on the portable device may be various. Thus, it may be very inconvenient to fix the annular accessory to the rear side of the portable device.

In particular, when charging the portable device using a magnetic-induction type wireless charging device, a metal ring included in the annular accessory may be heated while wireless charging the portable device, resulting in a fire or a user's burn. Therefore, a metal detection sensor may be required to built in the wireless charging device to stop the wireless charging device from charging the portable device when the metal detection sensor detects metal between a transmitter and of the wireless charger and a receiver of the portable device. Therefore, there is a need for a technology capable of charging a portable device with a metal accessory using the magnetic-induction type wireless charging device.

DETAILED DESCRIPTION OF THE INVENTION

Technical Problem

Example embodiments of the present invention provide an accessory for portable device, having a ring part of metal capable of being detachably and movably attached to the portable device.

Technical Solution

According to one aspect of the present invention, there is provided an accessory for portable device. The accessory includes a case which is to be mounted on the portable device, the case including a through hole extending in one direction, and a guide rail provided along both sides of the through hole, a plate including guide grooves being configured to receive the guide rail on both sides thereof, the plate being guided by the guide rail so as to be movable along an extending direction of the through hole, a connecting part rotatably fixed to the plate, a ring part pivotably fixed to the connecting portion so as to have various angles with respect to the connecting part, and at least one uneven portion including concave-convex portions which are arranged along the guide rail for receiving protrusions of the plate to fix the plate to a plurality of positions.

In an example embodiment, the accessory may further include a cap provided at an end of the through hole, the cap being configured to be removable from the case, wherein the plate is mounted on the guide rail or is separated from the guide rail through the end of the through hole when the cap is removed from the through hole.

In an example embodiment, the guide rail and the uneven portion may be formed on the cap as well such that the plate is able to move to the end of the through hole when the cap is still mounted in the through hole.

In an example embodiment, the accessory may further include a cover fixed to a lower surface of the plate, the cover being configured to shield the lower surface of the plate.

In an example embodiment, the plate may further include a leaf spring having a protrusion bent toward a side surface of the through hole, which is opposite to a side surface of the plate, and the uneven portion may be formed along the side surface of the through hole to receive the protrusions.

In an example embodiment, the protrusion of the leaf spring may protrude through a guide groove of the plate toward the side surface of the plate.

In an example embodiment, the plate may further include a leaf spring fixed to a lower surface of the plate, the leaf spring having a plurality of protrusions each projected upwardly toward a lower surface of the guide rail, and the uneven portion may be formed along the lower surface of the guide rail to receive the protrusions.

In an example embodiment, the plate may include side grooves formed form the guide groove to the lower surface thereof and at both sides of the plate, and the protrusion of the leaf spring may protrude through both the guide groove and the side grooves toward the lower surface of the guide rail.

In an example embodiment, the plate may further include an upper plate to which the connection part is rotatably fixed, and a lower plate spaced apart from the upper plate and fixed to the upper plate to form the guide grooves, the lower plate having protrusions projected elastically toward both sides of the through-hole, which face both sides of the plate, respectively, and uneven portions may be formed along both sides of the through hole, respectively, to receive the protrusions.

Effects of the Invention

The accessory of the portable device according to the present invention moves along the guide rail provided on both sides of the through hole of the case, and the plate is provided to be detachable from the case. Therefore, the ring part coupled to the plate may be moved from the case or detachable from the case.

Further, even if the ring part is formed of a metal material, a position of the ring part may be changeable, or the ring part may be separated from the case. Therefore, the portable device on which the accessory is mounted may be charged in the magnetic-induction type wireless charging device.

BRIEF DESCRIPTION OF THE DRAWINGS

FIG. 1 is a perspective view illustrating an accessory of portable device in accordance with an example embodiment of the present invention.

FIG. 2 is an exploded perspective view illustrating the accessory of portable device in FIG. 1.

FIG. 3 is a rear perspective views illustrating the accessory of portable device in FIG. 1.

FIG. 4 is a perspective view illustrating an accessory of portable device in accordance with another example embodiment of the present invention.

FIG. 5 is an exploded perspective view illustrating the accessory of portable device in FIG. 4.

FIG. 6 is a rear perspective views illustrating the accessory of portable device in FIG. 4.

FIG. 7 is a perspective view illustrating an accessory of portable device in accordance with still another example embodiment of the present invention.

FIG. 8 is an exploded perspective view illustrating the accessory of portable device in FIG. 7.

FIG. 9 is a rear perspective views illustrating the accessory of portable device in FIG. 7.

BEST MODE OF THE INVENTION

Hereinafter, accessories for portable device are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element discussed below could be termed a second element without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view illustrating an accessory of portable device in accordance with an example embodiment of the present invention. FIG. 2 is an exploded perspective view illustrating the accessory of portable device in FIG. 1. FIG. 3 is a rear perspective views illustrating the accessory of portable device in FIG. 1.

Referring to FIGS. 1 to 3, an accessory for portable device 100 in accordance with an example embodiment includes a case 110, a plate 120, a connection part 130, a ring part 140 and an uneven portion 150.

The case 110 is mounted on a rear side opposite to a front side of a display window included in a portable device (not shown). For example, the case 110 may be either fitted or attached to the rear surface of the portable device. The case 110 protects the portable device.

The case 110 has a through hole 112 extending in one direction. A guide rail 114 is provided to be fixed to the case 110 along both sides of the through-hole 112 in an extending direction of the through hole 112. That is, the guide rail 114 may protrude from both side surfaces of the through hole 112 in a direction parallel to the front surface of the case 110.

The plate 120 is inserted into the through hole 112 and can be moved along an extending direction of the through hole 112 while being guided by the guide rail 114.

The plate 120 includes at least one guide groove 122 at both sides thereof. A pair of guide grooves 122 may be provided only on both sides of the plate 120. Alternatively, the guide groove 122 may be provided along a side circumference of the plate 120.

The guide rail 114 is accommodated in the guide groove 122 so that the guide rail 114 may guide a movement of the plate 120.

Since the plate 120 moves along the extending direction of the through hole 112, the plate 120 mounted to the case 110 may be located at a changeable position.

The plate 120 includes a leaf spring 124.

The leaf spring 124 is fixed to the plate 120, and the leaf spring 124 includes a protrusion 124a. The protrusion 124a is bent toward one side of the through hole 112, which faces one side of the plate 120. Specifically, the protrusion 124a of the leaf spring 124 may protrude through the guide groove 122 of the plate 120 to a side surface of the plate 120. Therefore, the protrusion 124a of the leaf spring 124 may be kept with protruding from the plate 120 using an elastic force.

A cover 126 is further provided to be fixed to a lower surface of the plate 120 such that the cover 126 may shield the lower surface of the plate 120. For example, the cover 126 may be adhered to the lower surface of the plate 120. The cover 126 may prevent the lower surface of the plate 120 from being exposed to the outside.

In addition, when the leaf spring 124 is inserted through the lower surface of the plate 120 and fixed to the plate 120, the cover 126 may suppress the plate spring 124 from releasing from the plate 120.

The uneven portion 150 is provided to have a plurality of concave-convex portions along the guide rail 114.

For example, the uneven portion 150 is formed on one side surface of the through hole 112 along the extending direction of the through hole 112. At this time, the uneven portion 150 may be formed at a height lower than that of the guide rail 114. Alternatively, the uneven portion 150 may be formed along the side surface of the guide rail 114.

The uneven portion 150 may fix the plate 120 at various positions of the through hole 112 by accommodating the protrusion 124a of the plate spring 124 in a space defined by the concave-convex portions.

Meanwhile, the case 110 may further include a cap 116 provided to be detachable from the case 110 at an end of the through hole 112.

The cap 116 has an approximately U-shape with having an open side portion. Both the guide rail 114 and the uneven portion 150 may extend to the cap 116. In addition, the open side portion of the cap 116 communicate with the through hole 112. Accordingly, the plate 120 may move to the end of the through hole 112 while the cap 116 is mounted on the case 110.

In addition, the plate 120 may be mounted on the guide rail 114 or separated from the guide rail 114 through the end of the through hole 112 when the cap 116 is removed from the case 110.

In order to easily mount or remove the plate 120, the cap 116 has a size preferably larger than that of the plate 120.

The connection part 130 includes a connection block 132 and a fastening member 134.

The connection block 132 is provided on an upper surface of the plate 120, and the fastening member 134 penetrates from a lower surface of the plate 120 through the plate 120, and is fastened to the connection block 132. Examples of the fastening member 134 include screws, rivets, and the like. Therefore, the connection unit 130 may be rotatably fixed to the plate 120.

The ring part 140 is fixed to the connecting portion 130 and can be rotated to have various angles with respect to the connecting part 130.

For one example, the ring part 140 is fixed through the connecting part 130, and the ring part 140 is rotated in stages by a certain angle with respect to the connecting part 130 by using a frictional force between the connecting part 140 and the connecting part 130.

In another example, the ring part 140 has an opening portion, and the opening portion may engage the ring part 140. By forming protrusions and grooves in positions where the ring part 140 and the connection part 130 are engaged, the ring part 140 may be rotated stepwise with respect to the connection part 130 by a predetermined angle.

The ring part 140 has a flat portion positioned at another side opposite to one side connected to the connection part 130. The flat portion widens a contact area when the ring part 140 contacts a bottom surface (not shown). That is, the accessory 100 may stably support the portable device. That's why the accessory may have a larger contact area when the flat portion of the ring part 140 contacts the bottom surface than in case other portion of the ring part 140 contacts the bottom surface The ring part 140 may be made of a high-strength metal or plastic material so that the ring part 140 may be suppressed from being easily damaged by the user.

According to the embodiment, when charging the portable device with the accessory 100 mounted thereon using a magnetic induction type wireless charging device, the plate 120, the connection part 130, and the ring part 140 may be able to move or may be able to be separated from the case 110 such that the plate 120, the connection part 130, and the ring part 140 may not be located between a transmitter of the wireless charging device and a receiver of the portable device. Therefore, even if at least one of the plate 120, the connecting portion 130, and the ring part 140 is made of a metal material, the wireless charging device can charge the portable device on which the accessory 100 is mounted.

FIG. 4 is a perspective view illustrating an accessory of portable device in accordance with another example embodiment of the present invention. FIG. 5 is an exploded perspective view illustrating the accessory of portable device in FIG. 4. FIG. 6 is a rear perspective views illustrating the accessory of portable device in FIG. 4.

Referring to FIGS. 4 to 6, an accessory for portable device 200 in accordance with an example embodiment includes a case 210, a plate 220, a connection part 230, a ring part 240 and an uneven portion 250.

The case 210, the connecting part 230 and the ring part 240 are identical to those of the accessory for portable device 100 illustrated with reference to FIGS. 1 to 3. Thus, a detail explanation on the case 210, the connecting part 230 and the ring part 240 will be omitted The plate 220 may be inserted into a through hole 212 and guided by a guide rail 214 to move along an extending direction of the through hole 212.

The guide rail 214 is accommodated in guide grooves 222 so that the guide rail 214 may guide the plate 220.

Since the plate 220 moves along the extending direction of the through hole 212, a position of the plate 220 which is movably located in the case 210 can be easily changed.

The plate 220 includes a leaf spring 224.

The leaf spring 224 has a substantially flat shape, and is fixed to a lower surface of the plate 220. For example, the leaf spring 224 may be fixed to the lower surface of the plate 220 by a fastening screw 225. The leaf spring 224 has protrusions 224a projecting upwardly on both sides thereof. Therefore, the leaf spring 224 may be protruded toward a lower surface of the guide rail 214 while the protrusions 224a are fixed to the plate 220.

The plate 220 has side grooves 223 extending from a guide groove 222 to the lower surface of the plate on both sides. Accordingly, the protrusions 224a of the leaf spring 224 may protrude toward a lower surface of the guide rail 214 through the guide groove 222 and the side groove 223 of the plate 220, respectively.

A cover 226 is further provided to be fixed to the lower surface of the plate 220 such that the cover may shield the lower surface of the plate 220. For example, the cover 226 may be adhered to the lower surface of the plate 220. The cover 226 may prevent the lower surface of the plate 220 from being exposed to the outside.

The uneven portion 250 is provided to have a plurality of concave-convex portions along the guide rail 214. For example, the uneven portion 150 is formed on the lower surface of the guide rail 214 along the extending direction of the through hole 212.

The uneven portion 250 may fix the plate 220 at a plurality of positions by accommodating the protrusion 224a of the leaf spring 224 in the concave-convex portion.

According to the embodiment, when charging the portable device with the accessory 200 mounted thereon using a magnetic induction type wireless charging device, the plate 220, the connection part 230, and the ring part 240 may be able to move or may be able to be separated from the case 210 such that the plate 220, the connection part 230, and the ring part 240 may not be located between a transmitter of the wireless charging device and a receiver of the portable device. Therefore, even if at least one of the plate 220, the connecting portion 230, and the ring part 240 is made of a metal material, the wireless charging device can charge the portable device on which the accessory 200 is mounted.

FIG. 7 is a perspective view illustrating an accessory of portable device in accordance with still another example embodiment of the present invention. FIG. 8 is an exploded perspective view illustrating the accessory of portable device in FIG. 7. FIG. 8 is a rear perspective views illustrating the accessory of portable device in FIG. 7.

Referring to FIGS. 7 to 9, an accessory for portable device 200 in accordance with an example embodiment includes a case 310, a plate 320, a connection part 330, a ring part 340 and an uneven portion 350.

The case 210, the connecting part 230 and the ring part 240 are identical to those of the accessory for portable device 100 illustrated with reference to FIGS. 1 to 3. Thus, a detail explanation on the case 210, the connecting part 230 and the ring part 240 will be omitted The plate 320 may be inserted into a through hole 312 and guided by a guide rail 314 while moving along an extending direction of the through hole 312.

The plate 320 includes an upper plate 321 and a lower plate 323.

The connecting portion 330 is rotatably fixed to the upper plate 321.

Specifically, a connection block 332 is provided on an upper surface of the upper plate 321, and a fastening member 334 penetrates through the upper plate 321 from the lower surface of the upper plate 321 to be connected to the connection block 332.

The lower plate 323 is spaced apart from the upper plate 321 and fixed to the upper plate 321. As the upper plate 321 and the lower plate 323 are spaced apart from each other, a guide groove 322 may be formed along a side circumference of the plate 320. Therefore, the guide rail 314 is accommodated in the guide groove 322 so that the plate 320 can be guided by the guide rail 314.

Since the plate 320 moves along the extending direction of the through hole 312, the position of the plate 320 mounted in through hole of the case 310 can be easily changed.

In addition, the lower plate 323 is provided with protrusions 324 of which each is bent and projected toward both side surfaces of the through hole 312. Since the protrusions 324 are formed by bending, the protrusions 324 of the lower plate 323 may have an elasticity. Therefore, the protrusion 324 may maintain a state protruding from the lower plate 323 by an elastic force.

A cover 326 is further provided to be fixed to a lower surface of the lower plate 323 such that the cover may shield the lower surface of the lower plate 323. For example, the cover 326 may be adhered to the lower surface of the lower plate 323. The cover 326 may prevent the lower surface of the lower plate 323 from being exposed to the outside.

The uneven portion 350 is provided to have a plurality of concave-convex portions along the guide rail 314. For example, the uneven portion 350 is formed on one side surface of the through hole 312 along the extending direction of the through hole 312.

In particular, the lower plate 323 having the protrusions 324 may be positioned at a height lower that of the guide groove 322 such that the uneven portion 350 may be formed at position lower than that of the guide rail 314.

The uneven portion 350 may fix the plate 320 at various positions by accommodating the protrusion 324 of the lower plate 323 in the concave-convex portions.

According to the embodiment, when charging the portable device with the accessory 300 mounted thereon using a magnetic induction type wireless charging device, the plate 220, the connection part 330, and the ring part 340 may be able to move or may be able to be separated from the case 310 such that the plate 320, the connection part 330, and the ring part 340 may not be located between a transmitter of the wireless charging device and a receiver of the portable device. Therefore, even if at least one of the plate 320, the connecting portion 330, and the ring part 340 is made of a metal material, the wireless charging device can charge the portable device on which the accessory 200 is mounted.

According to some embodiment, when charging the portable device with the accessory mounted thereon using a magnetic induction type wireless charging device, the plate, the connection part, and the ring part may be able to move or may be able to be separated from the case. Therefore, even if at least one of the plate, the connecting portion, and the ring part is made of a metal material, the wireless charging device can charge the portable device on which the accessory is mounted.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of the present invention.

The invention claimed is:

1. An accessory for portable device, the accessory comprising:
    a case which is to be mounted on the portable device, the case including a through hole extending in one direction, and a guide rail provided along both sides of the through hole;
    a plate including guide grooves being configured to receive the guide rail on both sides thereof, the plate being guided by the guide rail so as to be movable along an extending direction of the through hole;
    a connecting part rotatably fixed to the plate;
    a ring part pivotably fixed to the connecting portion to have various angles with respect to the connecting part; and
    at least one uneven portion including concave-convex portions which are arranged along the guide rail for receiving protrusions of the plate to fix the plate to a plurality of positions.

2. The accessory of claim 1, further comprising a cap provided at an end of the through hole, the cap being configured to be removable from the case,
    wherein the plate is mounted on the guide rail or is separated from the guide rail through the end of the through hole when the cap is removed from the through hole.

3. The accessory of claim 2, wherein the guide rail and the uneven portion are formed on the cap as well such that the plate is able to move to the end of the through hole when the cap is still mounted in the through hole.

4. The accessory of claim 1, further comprising a cover fixed to a lower surface of the plate, the cover being configured to shield the lower surface of the plate.

5. The accessory of claim 1, wherein the plate further includes a leaf spring having a protrusion bent toward a side surface of the through hole, which is opposite to a side surface of the plate, and
    the uneven portion is formed along the side surface of the through hole to receive the protrusions.

6. The accessory of claim 5, wherein the protrusion of the leaf spring protrudes through a guide groove of the plate toward the side surface of the plate.

7. The accessory of claim 1, wherein the plate further includes a leaf spring fixed to a lower surface of the plate, the leaf spring having a plurality of protrusions each projected upwardly toward a lower surface of the guide rail, and
    the uneven portion is formed along the lower surface of the guide rail to receive the protrusions.

8. The accessory of claim 7, wherein the plate includes side grooves formed form the guide groove to the lower surface thereof and at both sides of the plate, and
    the protrusion of the leaf spring protrudes through both the guide groove and the side grooves toward the lower surface of the guide rail.

9. The accessory of claim 1, wherein the plate further comprises:

an upper plate to which the connection part is rotatably fixed; and a lower plate spaced apart from the upper plate and fixed to the upper plate to form the guide grooves, the lower plate having protrusions projected elastically toward both sides of the through-hole, which face both sides of the plate, respectively, and uneven portions are formed along both sides of the through hole, respectively, to receive the protrusions.

* * * * *